UNITED STATES PATENT OFFICE.

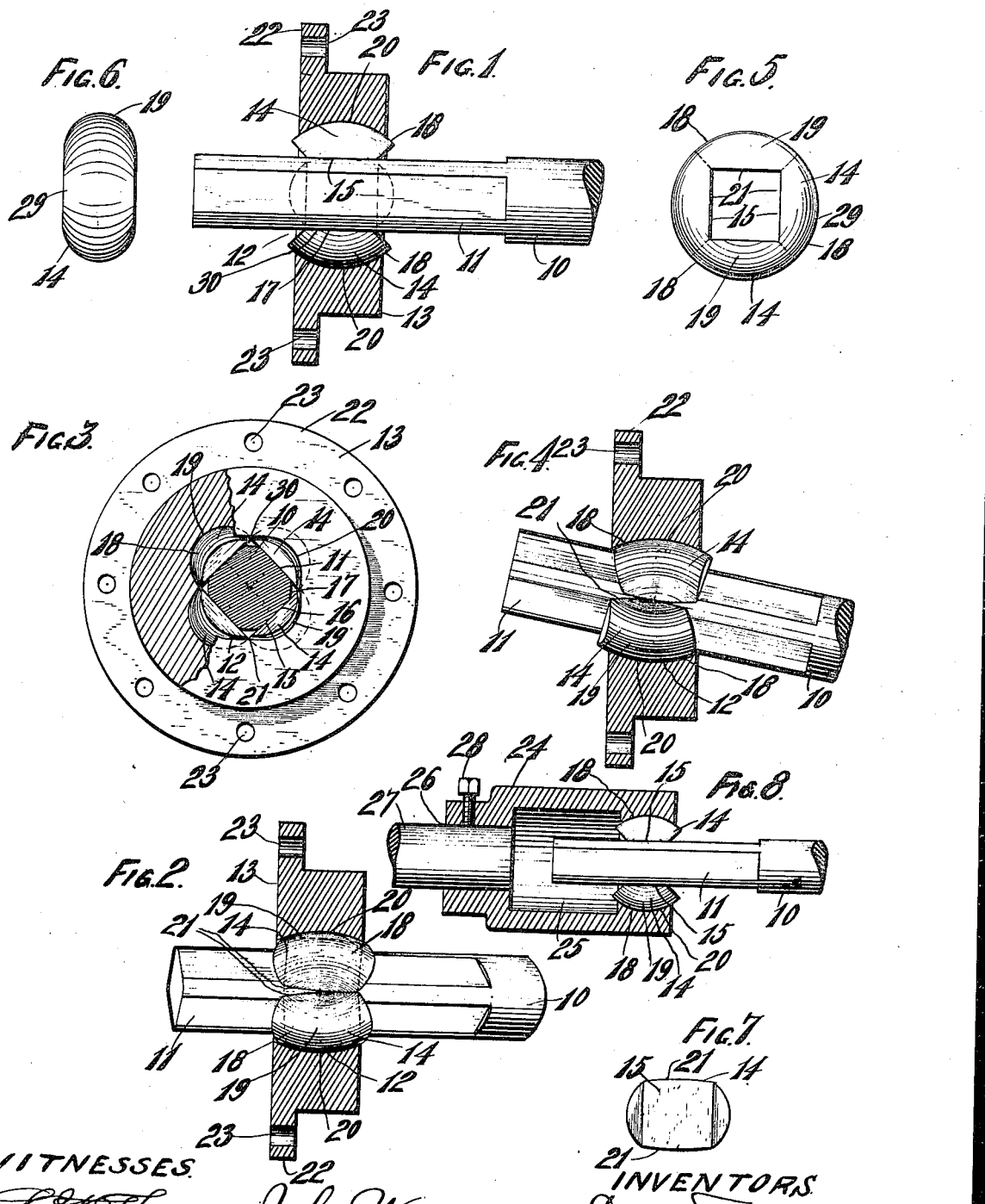

JOHN WITTEMANN, OF MILWAUKEE, AND EDWARD FLICEK, OF HARTFORD, WISCONSIN, ASSIGNORS, BY DIRECT AND MESNE ASSIGNMENTS, OF TWO-THIRDS TO SAID WITTEMANN AND ONE-THIRD TO FREDERICK S. HUNT, OF MILWAUKEE, WISCONSIN.

UNIVERSAL JOINT.

1,169,901.   Specification of Letters Patent.   Patented Feb. 1, 1916.

Application filed October 18, 1912. Serial No. 726,439.

*To all whom it may concern:*

Be it known that we, JOHN WITTEMANN and EDWARD FLICEK, citizens of the United States, and residents of Milwaukee, in the county of Milwaukee, and Hartford, in the county of Washington, State of Wisconsin, respectively, have invented new and useful Improvements in Universal Joints, of which the following is a description, reference being had to the accompanying drawings, which are a part of this specification.

This invention relates to improvements in universal joints.

It is one of the objects of this invention to provide a universal joint in which the use of pins or bolts is eliminated and a large area of bearing surface is provided to reduce wear and friction to a minimum.

A further object of the invention is to provide a universal joint which in part is formed on the end of a shaft and in which the shaft is permitted to move longitudinally therethrough and to be rotated at any angle desired within the range of the joint.

A further object of the invention is to provide a universal joint in which the parts interposed between the male and the female members of the joint may be formed in one piece and then separated into a plurality of parts for use.

A further object of the invention is to provide a universal joint, which is of very simple construction, is strong and durable and is well adapted for the purpose described.

With the above and other objects in view, the invention consists of the improved universal joint and its parts and combinations as set forth in the claims, and all equivalents thereof.

In the accompanying drawing in which the same reference characters indicate the same parts in all of the views: Figure 1 is a vertical central longitudinal sectional view of the improved universal joint; Fig. 2 is a similar view thereof with the parts revolved an eighth turn from the position shown in Fig. 1; Fig. 3 is a transverse sectional view thereof with parts broken away to show interior construction; Fig. 4 is a vertical central sectional view of the universal joint with the shaft shown in an inclined position; Fig. 5 is a side view of the curved blocks of the joint showing the manner of forming same; Fig. 6 is an edge view thereof; Fig. 7 is a face view of one of the blocks; and Fig. 8 is a vertical central longitudinal sectional view of a slightly modified form of the universal joint.

Referring to the drawing the numeral 10 indicates the shaft of the improved universal joint which is provided with a squared portion 11 at one end. The squared portion is adapted to extend into the opening 12 of the flanged coupling 13 of the joint and is connected thereto by four curved blocks 14 which are interposed between the shaft and the coupling. The inner flat faces 15 of the blocks bear against the flattened faces 16 of the shaft and form a square supplemental opening 17 for the shaft. The outer segmental peripheries 18 of each pair of oppositely-positioned blocks form segments of circles, the curved portions of which extend in longitudinal planes with relation to the shaft and intersect each other at right angles. The centers of the circles are coincident with the axis of the shaft. Transversely of the shaft the blocks are curved on a radius one half the radius of the curve of the blocks extending at right angles with relation thereto as indicated by the numeral 19. The inner portion of the flanged coupling surrounding the opening or bore 12 is provided with curved pockets or sockets 20 shaped to closely fit the curved peripheries of the blocks and to rotatively key the coupling and the blocks and the shaft together. The side edges 21 of the blocks are slightly curved as indicated to permit said blocks to rock freely, without binding, along the adjacent side edges of each other.

The flange 22 of the coupling is provided with bolt holes 23 for connection with other mechanism.

In the modified form shown in Fig. 8 a shaft coupling 24 is provided in lieu of the flanged coupling to illustrate a means for connecting the joint to the end of another shaft. This coupling is provided with a chamber 25 to permit the movement of the end portion of the shaft 10 and is also provided with a bore 26 to receive the end of a shaft 27. The shaft is secured to the coupling by a set bolt 28.

In cutting the blocks a piece of metal having a square opening or bore is turned to form a button like member 29 of a diameter twice the thickness of the squared portion of the shaft the blocks are designed to fit, and transversely of a diameter equal to the thickness of the squared portion of the shaft. The button is now divided radially of the larger diameter, from the corners of the bore outwardly, into four equal parts and these parts forming the quadri-segmental blocks are inserted into the coupling pockets so that their inner side edges 21 will contact with each other and form the supplemental opening or bore. The squared portion of the shaft 10 is now inserted within the supplemental opening formed by the blocks and the universal joint is thus completed and ready for use.

In use the blocks freely rock in their sockets when the parts are axially at an angle with relation to each other and are rotated, and the shaft is also free to slide longitudinally between the blocks. The blocks in rocking in their sockets by the angular movement of the shaft will slide longitudinally on said shaft and with relation to each other in order to preserve the same dimension of the bore at all angles of movement within the range of the coupling.

From the foregoing description it will be seen that the universal joint is of very simple construction, and the parts are provided with large bearing surfaces and are well adapted for the purpose desired.

What we claim as our invention is:—

1. A universal joint, comprising a coupling member having a bore, a shaft having rectangular flattened side portions slidably extending into the bore, and oppositely positioned blocks extending into the bore and interposed between the shaft and the coupling and having a slidable connection with the shaft and a rocking movement with the coupling and engaging all of the side faces of said shaft within the coupling.

2. A universal joint, comprising a coupling member having a bore and a plurality of recesses in the portion of the coupling surrounding the bore, blocks extending into the recesses and having a rocking movement therein and forming a rectangular supplemental bore, and a shaft extending into the supplemental bore and between the blocks and having a longitudinally slidable connection therewith, said blocks engaging all of the side faces of said shaft within the coupling and locking the parts rotatively together.

3. A universal joint, comprising a coupling member having a bore and a plurality of rounded recesses in the portion of the coupling surrounding the bore, segmental blocks having rounded portions extending into the recesses and provided with inner flat faces forming a rectangular supplemental bore of less diameter than the coupling bore, and a shaft having a rectangular portion which extends slidably into the supplemental bore and is closely engaged on all of its sides by the flattened faces of the blocks.

4. A universal joint, comprising a coupling member having a bore and a plurality of rounded recesses in the portion of the coupling surrounding the bore, said recesses being curved in one direction on the radius of a circle whose center is coincident with the axis of the coupling in a plane parallel to the bore thereof, segmental blocks having rounded portions positioned within and closely fitting the recessed portions of the coupling and having inner flat faces forming a rectangular supplemental bore within the coupling, and a shaft having a rectangular portion which extends slidably into the supplemental bore and is closely engaged on all of its sides by the faces of the blocks.

5. A universal joint, comprising a coupling member having a bore and a plurality of recesses in the portion of the coupling surrounding the bore, said recesses being curved in one direction on the radius of a circle whose center is coincident with the axis of the coupling in a plane parallel to the bore and being curved in a plane at right angles to the said bore on a radius approximately one half the length of the first mentioned radius, segmental blocks having rounded outer surfaces positioned within and curved to closely fit the said recesses, said blocks also having inner flat faces which form a supplemental bore within the coupling, and a shaft having a flattened portion which extends into the supplemental bore and closely engages the faces of the blocks.

6. A universal joint, comprising a coupling member having a bore and four recesses formed in the portion of the coupling surrounding the bore, said recesses being positioned diametrically opposite each other in pairs and each pair being positioned at right angles with reference to each other, said recesses being curved in one direction on the radius of a circle whose center is coincident with the axis of the coupling in a plane parallel to the bore and being curved in a plane at right angles to the said bore on a radius approximately one half the length of the first mentioned radius, quadri-segmental blocks, having rounded outer surfaces positioned within and curved to closely fit the said recesses, said blocks also having inner flat faces which form a square supplemental bore within the coupling, and a shaft having a squared end portion which extends into the square supplemental opening and closely engages the faces of the blocks.

7. A universal joint, comprising a coupling member having a bore and a plurality of curved recesses in the portion of the coupling surrounding the bore, a shaft extending into the bore and provided with a rectangular portion the side walls of which register with the recesses, and blocks having curved portions which extend into the recesses and also having flattened portions which engage all of the side walls of the rectangular portion of the shaft.

8. A universal joint, comprising a coupling member having a bore and a plurality of curved recesses in the portion of the coupling surrounding the bore, a shaft slidably extending into the bore and provided with a rectangular portion the side walls of which register with the recesses, and blocks interposed between the shaft and the coupling member and having curved portions which extend into the recesses and also having flattened portions which engage all of the side walls of the rectangular portion of the shaft, the curvatures of the blocks and the recesses permitting the blocks to slide longitudinally on the shaft with relation to the shaft and with relation to each other.

9. A universal joint, comprising a coupling member having a bore and a plurality of curved recesses in the portion of the coupling surrounding the bore, a shaft slidably positioned within the bore and provided with flattened side portions, and blocks interposed between the shaft and the coupling member and having curved portions which extend into the curved recesses and also having flattened portions which engage the flattened portions of the shaft, the adjacent edges of the blocks being shaped to permit the angular movement of the shaft in a diagonal direction with relation to the blocks, the curvatures of the portions of the blocks extending into the recesses permitting the blocks to slide longitudinally on the shaft with relation to the shaft and with relation to each other.

10. A universal joint, comprising a coupling member having a bore and a plurality of rounded recesses in the portion of the coupling surrounding the bore, said recesses being curved in one direction on the radius of a circle whose center is coincident with the axis of the coupling in a plane parallel to the bore thereof, and being curved in the opposite direction on a radius of less length than the first mentioned radius, segmental blocks closely fitting the recesses and having rounded outer surfaces corresponding to the curvatures of the recesses, the greatest length of said blocks being in the direction of the axis of the coupling, and the inner faces of said blocks forming a supplemental bore, and a shaft extending into the supplemental bore, and closely but slidably engaging the inner faces of the blocks whereby said shaft is capable of being thrown at any angle under any longitudinal adjustment thereof.

11. A universal joint, comprising a coupling member having a bore and oppositely positioned recesses, the recesses being curved in a direction coinciding with the bore and on the radius of a circle whose center is coincident with the axis of the coupling member, coupling blocks having outer curved portions which rockingly extend and fit into the recesses, the inner faces of said blocks being flat and forming a rectangular supplemental bore, and a shaft having a rectangular portion which slidably extends into the supplemental bore and is closely engaged on all of its sides by the flat faces of the blocks whereby the coupling member and the shaft may be rotated while at an angle with relation to each other.

In testimony whereof, we affix our signatures, in presence of two witnesses.

JOHN WITTEMANN,
EDWARD FLICEK.

Witnesses:
PETER J. MUELLER,
J. A. BUCKREWS.